US006253194B1

(12) United States Patent
Johnson et al.

(10) Patent No.: US 6,253,194 B1
(45) Date of Patent: Jun. 26, 2001

(54) SYSTEM AND METHOD FOR PERFORMING DATABASE QUERIES USING A STACK MACHINE

(75) Inventors: David L. Johnson, Seattle; David R. Parlin, Redmond; R. Scott Wigton, Redmond; Warren G. Stevens, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/097,925

(22) Filed: Jun. 16, 1998

(51) Int. Cl.[7] ....................................... G06F 17/30
(52) U.S. Cl. ................ 707/2; 707/4; 707/5; 707/104
(58) Field of Search .................... 707/1–2, 3, 4, 707/5, 104; 379/219; 717/1

(56) References Cited

U.S. PATENT DOCUMENTS

| 5,317,742 | * | 5/1994 | Bapat ........................................ 707/1 |
| 5,590,362 | * | 12/1996 | Baum et al. ............................. 707/1 |
| 5,594,899 | * | 1/1997 | Knudsen et al. ........................ 707/2 |
| 5,596,752 | * | 1/1997 | Knudsen et al. ........................ 717/1 |
| 5,682,535 | * | 10/1997 | Knudsen .................................. 717/1 |
| 5,694,608 | * | 12/1997 | Shostak ................................... 717/1 |
| 5,701,456 | * | 12/1997 | Jacopi et al. ........................ 707/104 |

OTHER PUBLICATIONS

Extracting Structures of HTML Documents, by Seung–Jin Lim and Yiu–Kai Ng, Computer Sciences Department, Brigham Young University, Provo, Utah, in Information Networking, 1998, Proceedings, 12th International Conference, pp. 420–426, Jan. 1998.*

* cited by examiner

Primary Examiner—Hosain T. Alam
Assistant Examiner—Diane D. Mizrahi
(74) Attorney, Agent, or Firm—Kilpatrick Stockton LLP

(57) ABSTRACT

A stack-language interface between a client application and its underlying database. To query the database, the client application passes a search expression to a database API. The search expression includes simple operands, which define values for individual search criteria, and one or more operators, which define the logical relationship between two or more operands. Upon receiving the search expression, the database API searches the database to retrieve records satisfying the search criteria. For each record, the database API executes the search expression on the stack machine to determine if the record matches the search criteria as defined by the operands and operators in the search expression. Once the relevant records are retrieved, the database API may present a list of objects representing those records to the client application.

29 Claims, 4 Drawing Sheets

SYSTEM AND METHOD FOR PERFORMING DATABASE QUERIES USING A STACK MACHINE

FIELD OF THE INVENTION

The present invention generally relates to database software applications. More particularly, the present invention relates to performing database queries using a stack-language interface between the database application and the underlying database engine.

BACKGROUND OF THE INVENTION

An Application Program Interface (API) is a set of software routines that a software application uses to request and carry out lower-level services performed by a computer's operating system. A database application, such as the MICROSOFT MONEY software application marketed by the Microsoft Corporation of Redmond, Washington, makes use of a "database API" to query and access a database, such as a financial database. For the purpose of this discussion, the database application is termed the "client application." Many such client applications make use of an Indexed Sequential Access Method (ISAM) database. The ISAM standard, known in the art, presents stored data as tables, with rows and columns representing data items and their fields. Rows can be traversed in the order in which they naturally occur, or in an order imposed by a related data structure serving as an index into a given table.

The database API provides the client application with the ability to query the ISAM database for specific records or sets of records. Many database APIs are written to conform to the Structured Query Language (SQL) or other similar language. SQL is a relational database language that consists of a set of facilities for defining, manipulating, and controlling data within a database. Querying a database using an SQL API requires passing SQL instructions to the SQL API, which are then parsed within the SQL API to form a filter. The filter is then used to identify the records in the database which satisfy the desired criteria of the query.

Unfortunately, there are several problems with the SQL language. For instance, the SQL language is text-based, which creates two related problems. First, to evaluate a SQL instruction, the SQL API must include software code to parse and lexically analyze the text instruction into a query plan that lends itself to analysis via a well-understood algorithm. The additional code to parse and lexically analyze the text instruction increases the executable size and execution time of the SQL API. Second, the text-based nature of SQL makes complex parameterized queries difficult to manipulate within the SQL API. In a SQL instruction having several conditions, passing the string from one function to another while tracking runtime parameters becomes very unwieldy.

Another problem is that the SQL language is not extensible. SQL is generally defined by an American National Standards Institute standard. Programmers cannot easily add conditions or parameters for SQL instructions without adding extra code, such as runtime libraries, to support stored procedures or custom expressions. The additional code again increases the overall executable size and may affect the performance of the SQL API.

In addition to those problems, the SQL API represents the ISAM database to the client application as tables of rows and columns. This feature makes SQL poorly suited for use with object-oriented programming languages, such as C++ and Java. Today's programmers prefer to take advantage of object-oriented programming due to its simplicity. Accordingly, a need exists for a database API which is easy to learn and which represents its underlying database as objects to the client application rather than as lower-level table rows and columns.

SUMMARY OF THE INVENTION

The present invention meets the above-described needs by specifying database queries for a database, such as an ISAM database, using a stack-language query structure. The invention can be implemented in a database API accessible to a client application constructed in accordance with the present invention. The database API resides as a software layer between a client application, such as a financial management software program, and the database containing the data for the client application. The client application accesses the database by issuing commands to, or "calling," the database API. The database API performs the lower-level file access and searching functions.

To perform a search for a set of desired database records, the client application builds a query by combining one or more "operands" and "operators," to form a search expression. The operands and operators together identify the desired search. For this discussion, the term "commands" may be used to collectively refer to operands and operators. Each operand defines a value for a parameter of an object in the database. For instance, an operand may be "(acct= checking)." That operand represents a request that the search results include objects having an "account" parameter equal to checking. Another operand may be "(date>1/1/98)." That operand represents a request that the search results include objects having a "date" parameter greater than Jan. 1, 1998. An operator represents a logical relationship between two or more operands. Operators are logical connectors, such as logical AND, OR, and NOT. Each operand or operator is a simple command defining a single search criterion. Accordingly, the database API does not need additional code to parse or lexically evaluate the search expression because the search expression is pre-formatted in separable portions which are easily understood by the database API.

The client application then passes the search expression to the database API. The search expression may include a single operand, or may include multiple operands with operators defining the logical relationship between the operands. The database API searches the database to retrieve records satisfying the search criteria by comparing each record to the stack. For each record, the database API executes the search expression on the stack machine to determine if the record matches the search criteria as defined by the operands and operators in the search expression. The database API may then pass the retrieved records to the client application as objects, or may pass a list of the retrieved records as a result set.

The present invention overcomes the disadvantages in the prior art because the commands in the search expression passed to the database API are used to build the query directly. The client application need not construct a complex, text-based search instruction to pass to the database API. The database API does not need excess code to parse and lexically analyze the search expression. Rather, the commands within the search expression may be executed directly by a stack machine to identify records in the database. In contrast, a client application sends a SQL API a text-based instruction string which must be parsed into particular sub-instructions and lexically analyzed before a search filter may be constructed.

Another advantage of the present invention is that the underlying database is represented as objects to the client application rather than as tables of rows and columns. An "object" is a software programming construct which encapsulates a group of data or information into a package. The object-oriented nature of the database API further simplifies the commands passed to the database API. Therefore, a programmer can more easily program a client application to search a database by using operands to define desired values for the object parameters, and operators to define the desired logical relationship between operands. Other features, aspects, and advantages of the present invention will become apparent upon reading the following detailed description of the embodiments, taken in conjunction with the drawings and the claims.

DETAILED DESCRIPTION OF THE EMBODIMENTS

The present invention is directed to creating a database query using a virtual stack machine. The present invention presents an underlying database as objects having fields, such as a transaction object having an amount field, a payee field, and a date field. To search the database, a client application passes a search expression containing commands representing the search criteria to a database API. The commands may be either operands or operators. The operands define values of interest for certain fields of the objects within the database, such as a value greater than Jan. 1, 1998 for the date field of an object. The operators define a desired logical relationship between operands. For instance, the operator AND results in the logical relationship that both operand 1 and operand 2 must return a true value. The operator OR results in the logical relationship that either operand 1 or operand 2 must return a true value.

The database API receives the search expression from the client application and searches the database to retrieve records satisfying the search criteria by comparing each record to the stack. For each record, the database API executes the search expression on the stack machine to determine if the record matches the search criteria as defined by the operands and operators in the search expression. The database API then presents the results of the search to the client application as a list of objects representing the records satisfying the search criteria.

Figure 1:
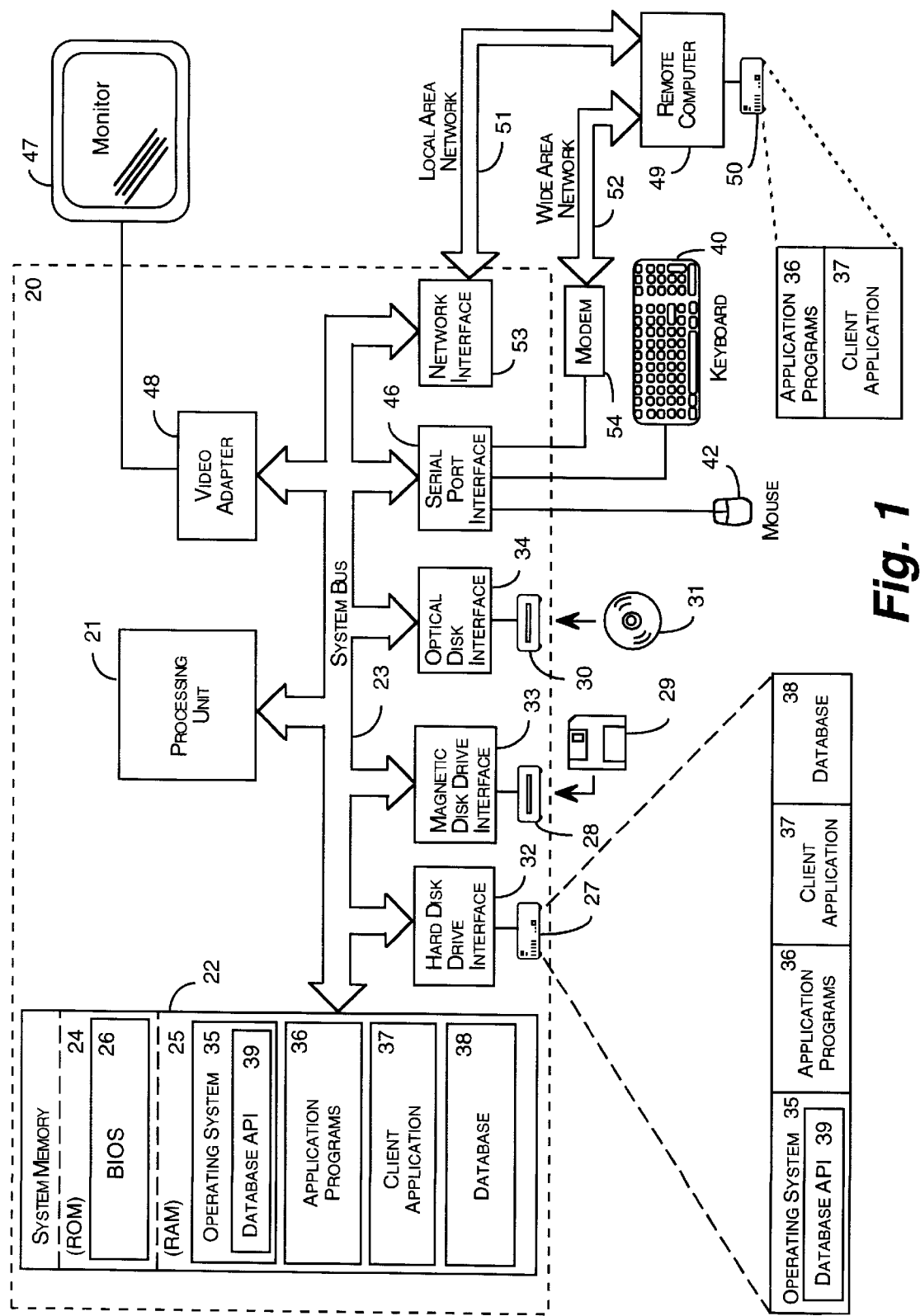
FIG. 1 is a block diagram of a computer that provides a portion of the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules, such as a client application 37, and program data, such as a database 38 associated with the client application 37. The operating system 35 may include a database API 39 in accordance with an exemplary embodiment of the present invention. In this embodiment, the invention may reside within the database API 39, the client application 37, and the database 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device 50. It will be appreciated that the network connections shown are exemplary and other means of establishing a communications link between the computers may be used.

Figure 2:
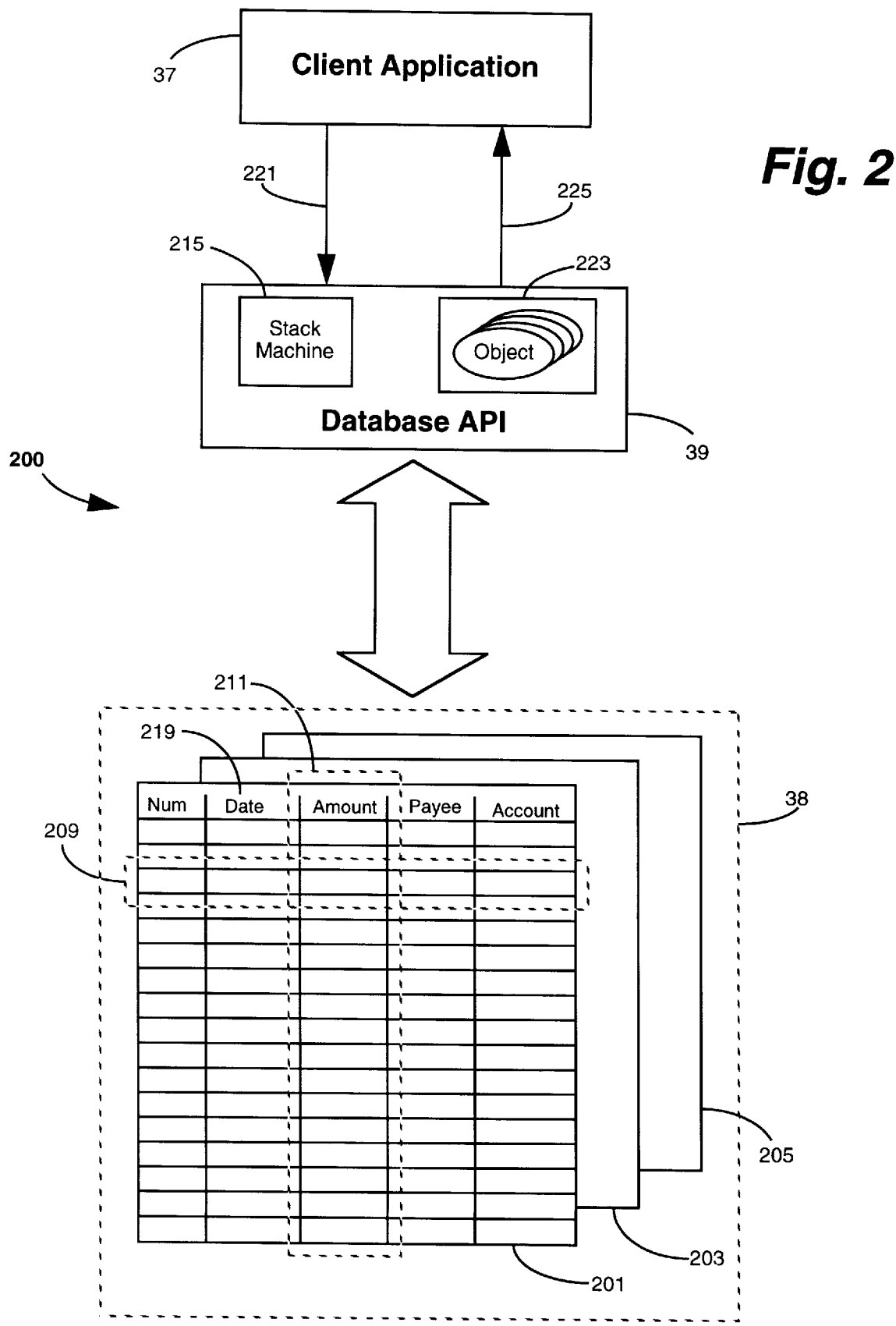
FIG. 2 is a functional block diagram of a database API constructed in accordance with an exemplary embodiment of the present invention and operative to accept stack-language commands from a client application to access a database.

FIG. 2 illustrates one embodiment of the present invention through the interaction of the client application 37, the database API 39, and the database 38 associated with the client application 37. The client application 37 may be a financial management software program, such as the MICROSOFT MONEY software program marketed by the Microsoft Corporation of Redmond, Washington. The client application 37 may accept and store user input, such as the user's financial information, and present the input in graphical form. The client application 37 may store the financial information in the database 38 (discussed below). The client application 37 accesses the database 38 through the database API 39.

The database 38 may be an ISAM database which stores the financial information as a table of rows and columns. Each table contains all objects of a particular type. For instance, the "transactions" table 201 may represent financial transactions (i.e., deposits, withdrawals, transfers, buys and sells) that occur in the user's checking, savings, and investment accounts. Likewise, the "accounts" table 203 may represent specific information (name, bank, account number) about the accounts themselves. Table 205 may represent information about "payees" involved in the user's financial transactions. The tables 201, 203, 205 may be linked to each other such that information resident in one table is also referenced in another table. A transaction in table 201 may reference an account in table 203 and a payee in table 205.

The transactions table 201 is composed of information grouped as records. Each row in the transactions table 201 is a record. For instance, record 209 is composed of financial information found in the third row of the transactions table 201. Within record 209, the financial information is divided into several fields. Each column in the transactions table 201 represents a field. For instance, amount field 211 contains the amount information for each record in the transactions table 201. Therefore, the amount information for record 209 resides in the amount field 211. In this manner, much information can be stored in the database 38 and referenced by records and fields.

The database API 39 is a set of software routines that the client application 37 uses to request and carry out lower-level services performed by a computer's operating system, such as accessing the database 38. The database API 39 is the medium through which the client application 37 accesses the database 38. The database API 39 may be a part of the operating system 35.

The database API 39 does more than simple file accesses, such as reads and writes. The database API 39 is capable of performing searches on the database 38 to retrieve desired records. Moreover, the database API 39 represents elements of the database 38 as "objects" to the client application 37. An "object" is a software programming construct which encapsulates a group of data or information into a package. In this manner, the package of data or information can be manipulated without having to identify each individual element of data or information. In one example, record 209 may be represented to the client application 37 as a single object so that the client application 37 can manipulate all of the data contained in the record 209 as a unit, rather than as individual table cells or as bytes of data. Object-oriented programming is known in the art.

The database API 39 includes a "stack machine" 215, which may be a location in the memory 22 for executing the commands received from the client application. The stack machine 215 processes the records using push and evaluate operations. Stack machines are known to those skilled in the art. As discussed in further detail below with respect to FIG. 4, the stack machine 215 executes the commands issued from the client application 37 in accordance with the stack-language structure in order to evaluate records in the database 38.

The client application 37 allows the user to search for groups of desired records or other information stored within the database 38. The client application 37 may present the user with a dialog box, and receive user input defining relevant search criteria. For instance, the user may desire to search for all checks written to a particular payee since Jan. 1, 1998. The client application 37 receives that input and prepares to query the database 38 to retrieve the desired information.

The client application 37 queries the database 38 by passing a search expression to the database API 39. In the disclosed embodiment, rather than issuing a SQL-type instruction which must be parsed, the search expression includes operands and operators assembled in stack-language fashion. As noted above, operands are simple commands which assign a value to a parameter of an object. The object may be implemented by a record, such as record 209 in the database 38. If the object corresponds to a record, the parameter typically corresponds to a field of the record. If the object is a table, the parameter may identify which of the multiple tables 201, 203, 205 in the database 38 is referenced. Each operand simply defines a single search criterion for the overall search. Accordingly, the client application 37 may construct several operands which each reflect a single search criterion of the desired search. In this manner, complex searches may be broken down into individual operands with each operand defining a single search criterion.

In keeping with the above example, the first operand may identify the particular payee as "John Smith." The first operand may be represented by the command "(payee='John Smith')." Similarly, a second operand may be represented by the command "(date>1/1/98)," to retrieve only the desired information having a date greater than Jan. 1, 1998. The client application 37 may then construct an operator to define the logical relationship between those two operands.

In this example, a first operator may be represented by the command "(AND)," so that only records returning a value of TRUE when tested against both operands are retrieved. A third operand may be represented by the command "(acct= checking)," so that only transactions in the user's checking account are relevant. Finally, a second operator may be represented by the command "(AND)," which defines the logical relationship between its two pertinent operands.

In the disclosed embodiment, one operator defines the logical relationship between two operands. It will be understood by those skilled in the art that the result of combining two operands and an operator may also serve as a single operand. In other words, if two operands and an operator achieve a result, the result may be treated as an operand having a logical relationship with a third operand. In accordance with this stack-language structure, the client application 37 may assemble the search expression with the above-identified commands in the following order:

Push(acct=checking);
Push(date>1/1/98);
Push(AND);
Push(payee="John Smith");
Push(AND).

An "Expression Tree" graphically illustrating the search expression containing the commands above may appear as follows:

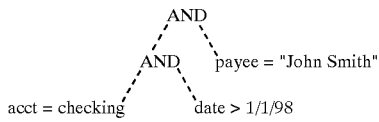

That expression tree identifies records in the database 38 satisfying the criteria that a record have an account type equal to checking, that the date be later than Jan. 1, 1998, and that the payee equal John Smith.

The client application 37 then passes the search expression, using path 221, to the database API 39 which begins the search. Once the search expression is received, the database API 39 begins searching the database 38 to retrieve records satisfying the search criteria by executing the search expression on the stack machine.

The database API 39 may first identify each record in the transactions table 201 having an account type equal to checking. A list is formed identifying those records whose account type is checking. Next, the database API 39 may test the records on the list to determine which of those records also have a value in the date field 219 later than Jan. 1, 1998. Records not satisfying that criteria are deleted from the list. Finally, the database API 39 tests the list to identify which of those records also have a payee field equal to "John Smith." Records not satisfying that criteria are deleted from the list. The records remaining on the list satisfy the criteria of the user's requested search. Searching the database 38 is discussed in greater detail below, with respect to FIG. 4.

The database API 39 then passes the list of records satisfying the search criteria to the client application 37. The database API 39 may pass, via path 225, a result set 223 to the client application 37. The result set 223 may be a listing of the records which satisfy the search criteria, or the result set 223 may be the records themselves, with each record represented as an object. As mentioned above, the records are represented to the client application 37 as objects rather than as columns and rows of information. In this way, the client application 37 may more easily manipulate the information contained in each record.

Figure 3:
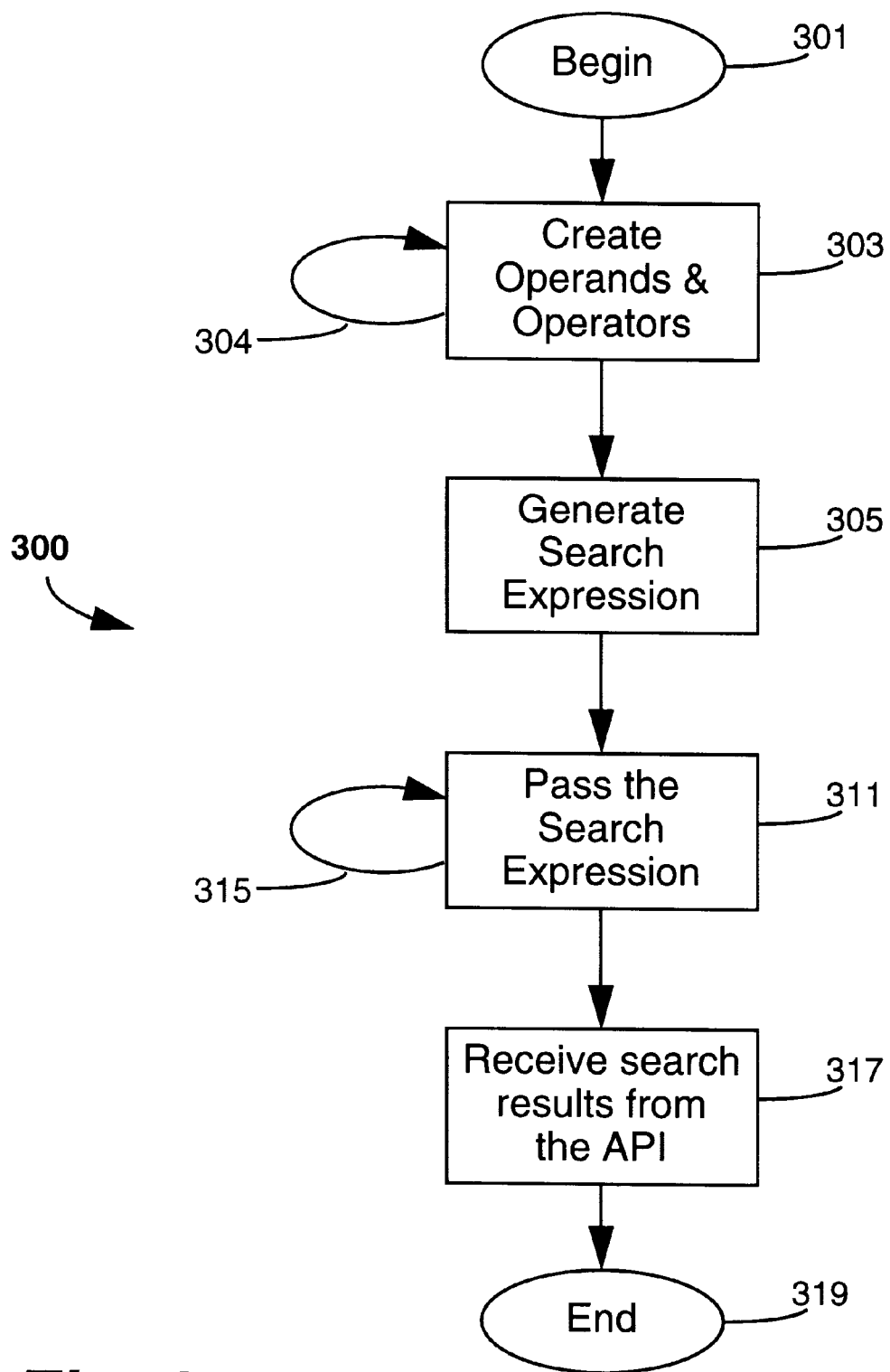
FIG. 3 is a flow diagram depicting steps performed by a client application constructed in accordance with an exemplary embodiment of the present invention to accomplish a search of a database.

FIG. 3 is a flow diagram 300 depicting steps performed by the client application 37 to accomplish a search of the database 38. The flow diagram 300 enters at beginning step 301, where the client application 37 awaits user input. Processing continues at step 303 where the client application 37 receives user inputs.

At step 303, the user inputs to the client application 37 each of multiple desired search criteria. The client application 37 creates operands and operators, as appropriate, from each user input. For instance, a first operand is built from the first user input which represents a single search criterion of the overall requested search. For example, at step 303, the client application 37 may create a first operand defining that the search return all records having a payee equal to "John Smith." The first operand may take the form of the command "(payee='John Smith')."

Processing may remain at step 303, via loop 304, until all of the user input is received. For example, during a second pass through step 303, a second operand may be built from a second user input which represents another search criterion of the overall desired search. Similar to the first operand, the client application 37 may create a second operand defining that the search return only records having a date later than Jan. 1, 1998. The second operand may take the form of the command "(date>1/1/98)." During the next pass through step 303, an operator may be built which defines the logical relationship between the first operand and the second operand consistent with the desired search criteria. Examples of operators may be the logical AND, the logical OR, or the logical NOT. Other examples of operators will be readily apparent to those skilled in the art. After the operator is built, the client application may receive an indication, such as a terminating user input, to perform the search. Processing then terminates loop 304 and continues at step 305.

At step 305, a search expression is generated. The search expression includes the operands and operators created at step 303. Generating the search expression involves assembling the operands and operators in accordance with the stack-language structure. Operands should be presented in the order dictated by the logical relationships between operands. An operator defines the logical relationship between the previous two operands. Also, the result of two operands and an operator may be used as a single operand. Accordingly, in the given example, the search expression presents the first operand, the second operand, and then the operator. The stack-language structure is well known to those skilled in the art. In addition, the search expression may include an indicator of a desired order for the results of the search to be returned (i.e., date order or payee order). Processing then continues as step 311.

At step 311, the client application 37 calls the database API 39 and passes the search expression. Those skilled in the art will understand that the client application 37 may pass the search expression as a parameter of the call to the database API 39. Passing the search expression causes the database API 39 to begin the search. For example, the database API 39 may begin executing the search expression on the stack machine 215 to determine which records in the database 38 match the search criteria (discussed in greater detail below). While the search is being conducted, the client application awaits the results at loop 315.

Loop 315 is terminated and processing continues at step 317 when the client application 37 receives from the database API 39 the results of the search. As previously discussed, the database API 39 represents the database 38 as objects to the client application 37. Accordingly, the client application 37 may receive a single object representing a list of the records found during the search of the database 38, or several objects with each object representing one of the records found during the search. The results may also be sorted in accordance with a particular sort order identified in the search expression. Once the search results are received, processing ends at ending step 319.

Figure 4:
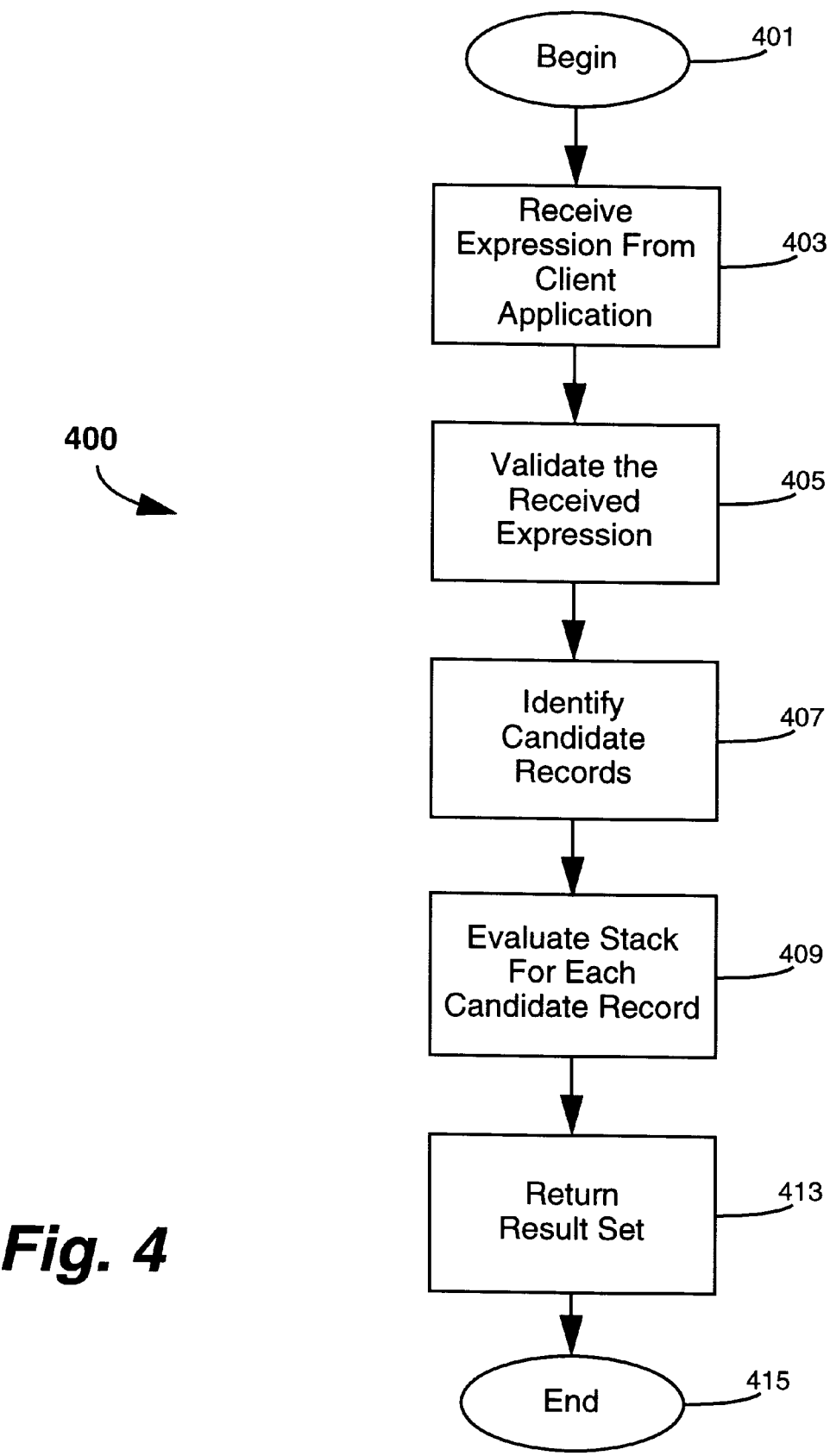
FIG. 4 is a flow diagram depicting steps performed by an exemplary embodiment of the present invention to search a database.

FIG. 4 is a flow diagram 400 illustrating in greater detail the steps performed by the database API 39 to search the database 38. The flow diagram 400 enters at beginning step 401, where the database API 39 awaits commands from a software program, such as the client application 37. Those skilled in the art will appreciate that because it is a part of the operating system 35, the database API 39 of the disclosed embodiment may be available to a number of software programs executing on the personal computer 20.

At step 403, the database API 39 receives a search expression from the client application 37. The search expression includes one or more operands and may include operators defining a logical relationship between two or more operands. For this discussion, the operands and operators are collectively referred to as commands. Each command defines a search criterion for a search of the database 38. The search expression may also be empty (contain zero operands), meaning that all the records in the database 38 satisfy the search criteria (essentially a "return all records" request). The search expression may also contain an indicator of a desired sort order for the results of the search, such as by date or category.

In the disclosed example, the search expression contains three commands: a first operand, a second operand, and an operator. The first operand represents a request for all of the records in the database 38 having John Smith as a payee. The second operand represents a request for all of the records in the database 38 with a date later than Jan. 1, 1998. The operator represents the logical "AND." Those skilled in the art will appreciate that applying the operator to the first operand and the second operand results in defining a search for records in the database which are both dated after Jan. 1, 1998 and reflect John Smith as the payee. The commands may be represented as "(payee='John Smith')," "(date>1/1/98)," and "(AND)" respectively.

At step 403, the database API 39 may also receive a command indicating that all of the operands and operators necessary to define the search have been passed. For example, an "(apply filter)"command may be received. In response to receiving the "(apply filter)" command, processing proceeds to step 405.

At step 405, the search expression is validated to ensure that it comports with proper stack-language structure. In other words, the search expression is validated to ensure that there are a proper number of operators to act on a proper number of operands and in an order which is logical with respect to the stack-language structure. Once the search expression is validated, the database API 39 stores each operand and operator from the search expression in memory 22 in accordance with the stack-language construct. The operands bearing logical relationships to each other should be stored in sequence, followed by the operator defining that logical relationship. In the disclosed embodiment, the operator defines the logical relationship between only the two preceding operands. Alternatively, the operator may define a logical relationship between the immediately preceding operand and the result of several preceding commands. For instance, the "AND" logical relationship may exist between three or more operands. Accordingly, the operator may be stored after each of those three operands.

At step 407, the database API 39 identifies candidate records from the database 38. The candidate records may be identified by selecting a table in the database 38 based on an index. As mentioned above, the database 38 of the disclosed embodiment is an ISAM database. As a result, the tables within the database 38 have one or more indices that each define a specific sort order on an individual table. For example, the transactions table 201 may have a date index which represents the transactions table 201 sorted by date. In that case, to identify the records within that table 201 which are dated after Jan. 1, 1998, rather than test each record, the database API 39 can use the date index to position itself directly at the first record dated Jan. 1, 1998. In that way, the later records in the table 201 may be identified as relevant without having to test each record in the entire table 201 or database 38. The later records are identified as candidate records. It will be apparent to those skilled in the art that choosing the proper index may involve evaluating the stack machine 215 against known heuristics. Processing then continues at step 409.

At step 409, the stack machine is evaluated for each of the candidate records to identify those records which satisfy the search criteria. Evaluating the stack machine may include applying logical tests representing the operands and operators on the stack to each record. In the disclosed embodiment, the candidate records are those which are dated later than Jan. 1, 1998. Consequently, the logical test "AND" is performed against each candidate record and the operand "(payee='John Smith')." This test results in identifying only those records which are both dated later than Jan. 1, 1998 and reflect John Smith as payee. This process is repeated until all of the records satisfying the search criteria are identified. Processing then continues at step 413.

At step 413, the search of the database 38 is complete, and the database API 39 has identified all of the records which satisfy the search criteria. Accordingly, the search results are returned to the client application 37 as a list object containing the set of objects corresponding the identified records. Alternatively, the search results may be returned as a series of objects with each object representing a found record. Once the search results have been returned, processing continues at step 415, the ending step, and the database API 39 awaits more commands.

To summarize, the present invention provides a stack-language interface between a client application and its associated database. To query the database, the client application passes a search expression to a database API. The search expression includes simple operands, which define values for individual search criteria, and one or more operators, which define the logical relationship between two or more operands. Upon receiving the search expression, the database API searches the database to retrieve records satisfying the search criteria. For each record, the database API executes the search expression on the stack machine to determine if the record matches the search criteria as defined by the operands and operators in the search expression. Once the relevant records are retrieved, the database API may present a list of those records to the client application.

From a reading of the above description pertaining to the disclosed embodiments of the present invention, modifications and variations thereto may become apparent to those skilled in the art. Therefore, the scope of the present invention is to be limited only by the following claims.

What is claimed is:

1. A computer-implemented method for querying a database using a stack machine, wherein the database comprises a plurality of records, to retrieve information satisfying a search, comprising the steps of:

building a first operand defining a first value for a first search criterion of the search;

building a second operand and defining a second value for a second search criterion of the search;

building an operator defining a logical relationship between the first operand and the second operand, the logical relationship being dependent on the search;

creating a search expression comprising the first operand, the second operand, and the operator, the search expression being created in accordance with a stack-language structure;

passing the search expression to an Application Programming Interface, wherein the Application Programming Interface performs a sequence comprising the steps of;

identifying those records that satisfy the search expression using a stack machine; and receiving the records from the database, which satisfy the search expression.

2. The computer-implemented method of claim 1, wherein the first operand defines a value for a parameter of an object in the database.

3. The computer-implemented method of claim 2, wherein the parameter of the object is a field of a record in the database.

4. The computer-implemented method of claim 1, wherein the second operand defines a value for a parameter of an object in the database, the parameter being an identifier of a table within the database.

5. The computer-implemented method of claim 4, wherein the table within the database contains a plurality of rows and a plurality of columns, each row in the plurality of rows representing a record in the database, and each column in the plurality of columns representing a field for the plurality of rows.

6. The computer-implemented method of claim 1, wherein the step of passing the search expression includes passing a command to initiate the query.

7. The computer-implemented method of claim 1, wherein the object received represents the results of performing a search on the database for records in the database which satisfy the search.

8. The computer-implemented method of claim 7, wherein the object represents a list of records in the database, each of the records comprising a value in a first field which satisfies the first search criterion of the first operand and a value in a second field which satisfies the second search criterion of the second operand.

9. The computer-implemented method of claim 8, wherein a logical relationship between the value in the first field and the value in the second field satisfies the logical relationship defined by the operator.

10. The computer-implemented method of claim 1, further comprising, validating the search expression to insure that the search expression is in the proper stack-language structure.

11. A computer-implemented method for querying a database using a stack machine, wherein the database comprises a plurality of records, to retrieve information satisfying a search, comprising the steps of:

passing a search expression created in accordance with a stack-language structure from a client application to a database API, the client application operative to accept an input defining a search comprising at least one search criteria, the search expression comprising a command representative of the search criteria for the search, the database API comprising the stack machine operative to execute the search expression on a stack machine for evaluation;

executing the search expression on the stack machine to identify a record in the database which satisfies the search criteria; and passing the identified record from the database to the client application as a unit of data capable of being manipulated as a single object.

12. The computer-implemented method of claim 11, wherein the command comprises an operand defining a value for a field of the record in the database.

13. The computer-implemented method of claim 12, wherein the search expression further comprises a second command, the second command comprising a second operand defining a second value for a second field of the record in the database.

14. The computer-implemented method of claim 13, wherein the search expression further comprises a third command, the third command comprising an operator defining a logical relationship between the first operand and the second operand, the logical relationship being dependent on the search.

15. The computer-implemented method of claim 11, further comprising, identifying candidate records from the plurality of records in the database using at least one index associated with the plurality of records to identify those candidate records that satisfy the search expression using the stack machine.

16. The computer-implemented method of claim 11, further comprising, identifying candidate records from the plurality of records in the database using at least one index associated with the plurality of records.

17. A computer-readable medium having computer-executable instructions for querying a database comprising a plurality of objects to retrieve information satisfying a search, which when executed perform the steps of:

building a first operand defining a first value for a first search criterion of the search;

building a second operand defining a second value for a second search criterion of the search;

building an operator defining a logical relationship between the first operand and the second operand, the logical relationship being dependent on the search;

creating a search expression comprising the first operand, the second operand, and the operator, the search expression being created in accordance with a stack-language structure;

passing the search expression to an Application Programming Interface and placing the search expression in a stack language structure;

using a stack machine to evaluate the search expression in the stack language structure and compare the search expression to the plurality of objects in the database; and receiving an object, which satisfies the search criteria.

18. The computer-implemented method of claim 17, further comprising, identifying candidate records from the plurality of records in the database using at least one index associated with the plurality of records.

19. A computer readable medium having computer executable instructions for forming a database query, to search the database comprising a plurality of records, which instructions when executed, perform the steps, comprising:

generating a logical expression comprising the steps of;

receiving a first operand from a client application, the first operand defining a first search criterion for a search of a database;

pushing the first operand on a stack machine, the stack machine comprising a location in the memory for storing, data in a "last-in-first-out" scheme;

receiving a second operand from the client application, the second operand defining a second search criterion for the search of the database;

pushing the second operand on the stack machine;

receiving an operator from the client application, the operator defining a logical relationship between the first operand and the second operand; and pushing the operator on the stack machine;

identifying candidate records from the plurality of records in the database using at least one index associated with each record;

evaluating the candidate records using the stack machine to identify a record in the database which satisfies the logical relationship between the first operand and the second operand; and returning the record to the client application as an object.

20. The computer readable medium of claim 19, wherein the first search criterion comprises a value for a parameter of an object in the database.

21. The computer readable medium of claim 20, wherein the parameter of the object represents a field of a record in the database.

22. The computer readable medium of claim 19, wherein the step of identifying the record in the database comprises evaluating the stack machine to construct a search filter, the search filter representing a test embodying the fist search criterion, the second search criterion, and the logical relationship between the first operand and the second operand.

23. The computer readable medium of claim 22, further comprising computer executable instructions for performing the step of accessing the database to apply the search filter to the information therein and retrieving the information that satisfies the search filter.

24. The computer readable medium of claim 19, wherein the step of returning the record to the client application comprises formatting the record such that the record is capable of being manipulated as a unit of information.

25. The computer-implemented method of claim 19, further comprising, identifying candidate records from the plurality of records in the database using at least one index associated with the plurality of records.

26. A computer-readable medium having computer-executable components, comprising:

a database containing information, the information comprising at least one table, the table comprising at least one record, and the record comprising at least one field;

a client application associated with the database and operative to receive input defining a search of the database, the client application further operative to build a first operand and a second operand, the first operand defining a first value for a first search criterion of the search, the second operand defining a second value for a second search criterion of the search, the client application further operative to build an operator, the operator defining a logical relationship between the first operand and the second operand;

a database API operative to receive from the client application the first operand, the second operand, and the operator within a search expression, the search expression having the first operand, the second operand, and the operator assembled in accordance with a stack-language structure, the database API further operative to store the first operand, the second operand, and the operator in a stack-language structure in memory, the database API comprising a stack machine operative to evaluate the information in the database for conformity with the first operand, the second operand, and the operator stored in the stack-language structure.

27. The computer-readable medium of claim 26, wherein the first value is related to the field of the record within the database.

28. The computer-readable medium of claim 27, wherein the second value is related to a second field of the record within the database.

29. The computer-implemented method of claim 26, wherein the API is further operative to identify candidate records from the plurality of records in the database using at least one index associated with the plurality of records.

* * * * *